May 8, 1945  J. J. WIRTS  2,375,455
COMMINUTOR BASE SEAL
Filed Aug. 16, 1943
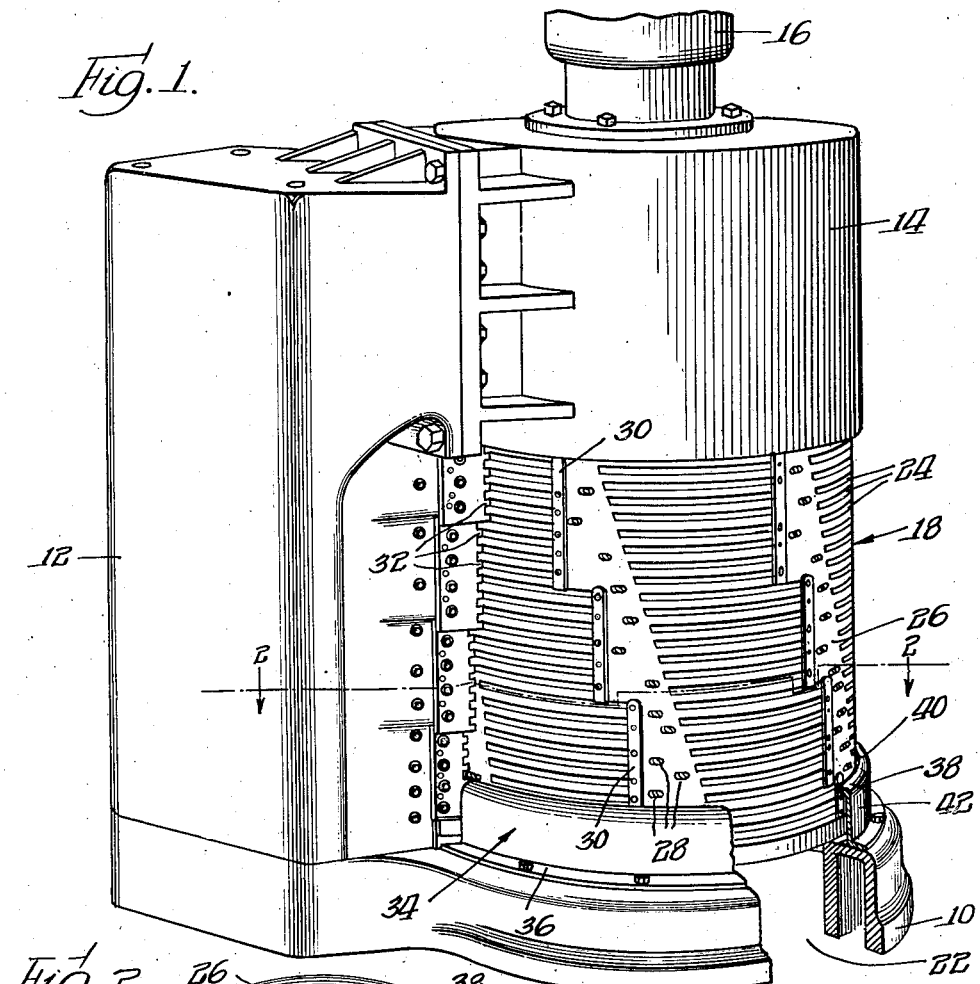
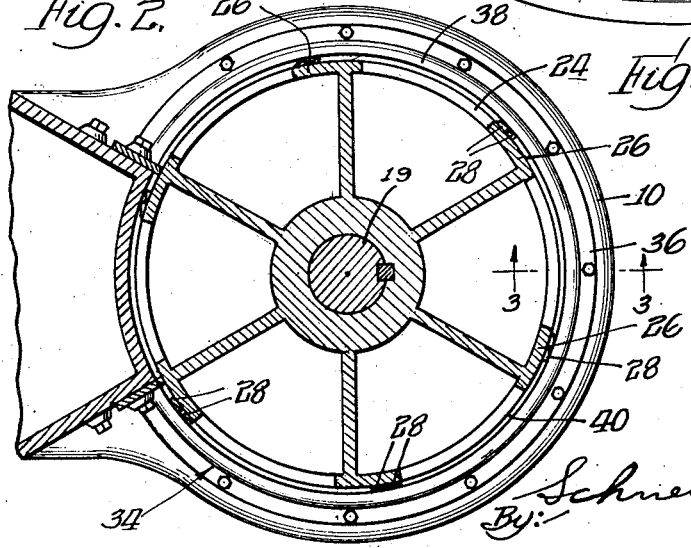
INVENTOR.
John J. Wirts
By: Schneider & Dressler
attys.

Patented May 8, 1945

2,375,455

UNITED STATES PATENT OFFICE 2,375,455

COMMINUTOR BASE SEAL

John J. Wirts, Cleveland, Ohio, assignor to Chicago Pump Company, a corporation of Delaware Application August 16, 1943, Serial No. 498,767

4 Claims. (Cl. 210—152)

This invention relates to comminuting devices of the rotary screen type and more particularly to improvements in the seal between the comminutor base and the rotary screen for preventing solids from by-passing the cutting zone of said device.

Comminuting devices in accordance with the present invention are usually installed in a basin which forms a part of the raw sewage channel. Pieces of wood, paper, rags, long stringy material and other solids carried by the sewage are strained therefrom by the rotary screen and are then comminuted at a cutting zone by the coaction of relatively moving cutting members. The small comminuted particles pass through the screen with the sewage liquor to the downstream channel, which may lead the sewage to a place for further treatment as is well-understood in the art. Some of the solids in the sewage entering the basin immediately pass to the cutting zone and are there comminuted either in whole or in part. The remainder of the solids along with recirculated partially comminuted solids are carried by the sewage liquor onto the screen which, in turn, carries the solids to the cutting zone. As this process continues the solids are comminuted to the desired size and pass through the screen to the downstream channel.

In order to prevent the solids from passing under the screen and thereby by-pass the cutting zone, the space between the bottom of the rotary screen and the comminutor base was bridged by a seal. This seal usually consisted of a strip of flexible material made from a water- and oil-resistant material such as Neoprene, having one edge fixedly secured to the comminutor base and the other edge in frictional engagement with the outer wall of the rotary screen at the bottom thereof. Because of the excessive wear on the seal material due to the rubbing action of the rotary screen and the abrasive action of the grit in the sewage, the seal had to be replaced frequently, thereby resulting in excessive maintenance costs. In addition, the rubbing action of the seal material on the rotating screen, augmented by the abrasive action of the grit, deleteriously affected the screen. Also, and particularly at the present time, the rubber-like materials from which these seals were made are not readily available for purposes not directly connected with the war effort. The foregoing and other disadvantages of these prior art seals render their use objectionable.

In accordance with the present invention I have devised a seal which is free from the foregoing objections in that it is not subjected to the rubbing action of the rotating screen and hence is not subjected to excessive wear, and which may be made of relatively inexpensive, relatively non-critical materials such as plastics, metals, etc. Moreover, the seal is simple in design and construction and relatively inexpensive to manufacture.

The seal of the present invention does not actually bridge the gap between the bottom of the rotary screen and the base of the comminuting device, but rather it forms a small chamber, having an entrance of restricted size, which extends completely about the gap and the exposed portion of the rotary screen, at and slightly above the lower extremity thereof. The entrance to the chamber is of a size to permit partially and completely comminuted solids and, particularly, uncomminuted or insufficiently comminuted stringy material to pass into the chamber with the sewage. These solids are then carried by the sewage against the screen and, in turn, by the screen to the cutting zone where they are comminuted. The seal of the present invention serves, in effect, to trap solids tending to by-pass the screen and to insure that these solids, particularly long stringy solids, are minuted before being carried to the downstream channel.

The present invention is illustrated in the accompanying drawing in conjunction with a preferred form of drum-screen type of comminuting device, shown and described in detail in the patent to Corson W. Chase, 2,322,922, granted June 29, 1943, and it is to be understood that it is not to be construed as limited for use with that form of device since it is capable of use in connection with all types of rotary screen comminuting devices.

The invention will be readily understood from the following description taken in conjunction with the accompanying drawing, in which:

Figure 1 is a perspective view of a preferred form of comminuting device, with parts broken away and in section to show the details of the seal in accordance with the present invention;

Fig. 2 is a horizontal section, taken substantially along the line 2—2 of Fig. 1, showing further details of the seal; and Fig. 3 is an enlarged detail section of the seal taken along the line 3—3 of Fig. 2.

Referring to the drawing, the comminuting device there shown is of the rotary drum-screen type and comprises a base 10 of annular shape, a standard 12 mounted thereon, a head 14 mounted on the standard, a motor 16 mounted on the head and a screen 18. The screen is of substantially cylindrical form, extending from the head to a position slightly above the top of the base, and is mounted for rotation on a shaft 19 (Fig. 2) which is driven by the motor. It will be noted that the inner periphery of the screen is aligned with the inner periphery of the annular-shaped base, thereby providing a space or gap 20 between the relatively moving parts disposed at right angles to the space or opening 22 defined by the base which communicates with the downstream channel.

The screen shown in the drawing is in the form of a casting having an outer cylindrical wall which is provided with a plurality of series of horizontal slots 24, each series being separated by solid wall portions 26, through which the liquid and comminuted solids may pass into the interior of the screen and, ultimately, to the downstream channel. Cutting teeth 28 are mounted in recesses formed in and throughout the length of the solid wall portions, as are also the elongated, vertically positioned, cutting or shear bars 30. The cutting teeth have a cutting portion which projects from the surface of the screen whereas the shear bars may or may not project from the screen, as desired. These teeth and shear bars coact with the teeth on the stationary cutting combs 32, which are mounted on standard 12 adjacent the screen, to comminute solids.

In use, the comminuting device is positioned within a basin into which a stream containing solids, such as a raw sewage stream, is introduced. The liquid and smaller solids pass through the screen and fall through the opening 22 in the base to the downstream channel. The larger solids are intercepted by the screen and are carried thereby to the cutting combs where they are comminuted to a size small enough so that they can pass through the screen along with the sewage liquor.

Mounted on base 10 is a substantially ring-shaped member or seal 34, of metal or other suitable material, having a substantially Z-shaped section, which extends entirely about gap 20 and the lower extremity of the screen except for the space occupied by standard 12. Seal 34 is provided with a cut-out to enable it to straddle the standard. The lower leg portion 36 of the seal is provided with an opening through which a bolt is threaded into the base to secure the seal thereto. The upper leg portion 38 is in-turned towards the screen and the free edge thereof terminates sufficiently far from the screen to allow for ample clearance for the projecting cutting teeth 28. For most types and sizes of comminuting devices a clearance space referred to by the numeral 40, in the order of about ⅝″, is sufficient for this purpose. Obviously, the size of this space may be varied to meet any particular requirements. The intermediate, vertically disposed web portion 42 of the seal may vary rather widely in height although it is essential that it be of sufficient height to overlap some of the cutting elements on the rotating screen.

For practical effectiveness in securing the desired comminution of the solids, particularly stringy solids, entering clearance space 40, web 42 should at least be of a height to overlap the first two rows of slots above the bottom of the screen, although I prefer that it be of a height to overlap three or four rows of slots. It may, of course, overlap a greater number of rows of slots but this is not essential and may even be objectionable since the capacity of the screen may thereby be unduly reduced.

Seal 34 forms a chamber 44 which extends about gap 20 and the lower extremity of the screen. The entrance to the chamber is the clearance space 40 and the exit therefrom is gap 20. The exit from the chamber is not aligned with the entrance thereto; in the form shown it is at right angles thereto, and this, in effect, forms somewhat of a labyrinth arrangement which does not favor the flow of liquid and solids suspended therein from chamber 44 directly to the exit as against the desired flow from the chamber to the slots in the screen.

In the operation of the comminuting device in accordance with the present invention, the raw sewage stream or other liquid stream containing solids flows into the basin containing the comminuting device and the liquid and smaller solids pass through the screen slots to the downstream channel. The intercepted solids are carried by the screen to the cutting zone and are there comminuted to a size so that they can pass through the slots. Some of the smaller solids and some of the uncomminuted or partially comminuted stringy solids may pass along with the liquid through clearance space 40 into chamber 44 and from there most, if not all, of the liquid and solids will flow towards the screen. The liquid and smaller solids will pass through the slots surrounded by the seal but the intercepted solids will be carried by the screen to the cutting zone where they will be comminuted to a size sufficiently small to enable them to pass through the slots.

It is apparent from the foregoing that with the seal of the present invention there is provided a chamber or trap for partially comminuted solids, particularly stringy solids, which might otherwise by-pass the screen and the cutting zone by passing through the usual clearance space between the lower edge of the screen and the base, from which the solids flow to the screen and to the cutting zone for comminution. Some long stringy solids entering chamber 44 may pass directly through gap 20; however, this will take place only occasionally, if it takes place at all, since the difference in head between the interior of the screen and the chamber surrounding the screen, coupled with the labyrinth arrangement of the exit from the chamber, favors the flow of liquid and suspended solids from the chamber through the screen.

The details as to shape and dimensions of the seal of the present invention may, of course, be varied in a manner readily apparent to a skilled worker in the art without departing from the scope of the appended claims, and hence these details are not to be considered as limitations upon the invention described. Whether the chamber-forming portion of the seal is of the shape and form shown and described, or is otherwise shaped and positioned to form the desired chamber and the necessary clearance space is immaterial, but I prefer the former.

I claim:

1. The combination with a comminuting device of the rotary screen type comprising a rotatable screen and a stationary base arranged to provide a space between the base and the lower extremity of the screen to allow for relative rotation between said screen and base and wherein cutting elements are provided on said screen substantially throughout the length thereof and wherein stationary cutting elements are positioned adjacent the screen and extend throughout the length thereof to coact with the rotatable cutting elements to comminute solids, of a stationary member secured to the base and extending upwardly therefrom above the lower portion of the screen to over-lap at least some of the cutting elements on the screen, said member forming with the said base and the lower portion of the said screen a chamber which substantially surrounds the said space and the said lower portion of the screen, the upper extremity of said member being spaced from said screen to allow for clearance between the rotatable cutting elements and the said member, said last-named space forming an entrance to said chamber and the said first-named space an exit therefrom.

2. The combination with a comminuting device of the rotary screen type comprising a rotatable screen and a stationary base arranged to provide a space between the base and the lower extremity of the screen to allow for relative rotation between said screen and base and wherein cutting elements are provided on said screen substantially throughout the length thereof and wherein stationary cutting elements are positioned adjacent the screen and extend throughout the length thereof to coact with the rotatable cutting elements to comminute solids, of a rigid stationary member secured to said base and extending upwardly therefrom above the lower portion of the screen to over-lap at least some of the cutting elements on the screen, said member forming with the said base and the lower portion of the said screen a chamber which substantially surrounds the said base and the said lower portion of the screen, the said space forming an exit from said chamber and the upper free extremity of said member being spaced from said screen to allow for clearance between the rotatable cutting elements and the said member and to provide an entrance to said chamber.

3. The combination with a comminuting device of the rotary screen type comprising a rotatable screen and a stationary base arranged to provide a space between the base and the lower extremity of the screen to allow for relative rotation between said screen and base and wherein cutting elements are provided on said screen substantially throughout the length thereof and wherein stationary cutting elements are positioned adjacent the screen and extend throughout the length thereof to coact with the rotatable cutting elements to comminute solids, of a rigid stationary member secured to said base and extending upwardly therefrom above the lower portion of the screen to over-lap at least some of the cutting elements on the screen, said member forming with the said base and the lower portion of the said screen a chamber which substantially surrounds the said base and the said lower portion of the screen, the said space forming an exit from said chamber and the upper free extremity of said member being spaced from said screen to allow for clearance between the rotatable cutting elements and the said member and to provide an entrance to said chamber of more restricted dimensions than said chamber.

4. A comminuting device of the rotary screen type comprising a rotatable screen and a stationary base arranged to provide a space between the base and the lower extremity of the screen to allow for relative rotation between said screen and base, said screen having cutting elements thereon substantially throughout the length thereof which are adapted to coact with stationary cutting elements to comminute solids and a rigid stationary member secured to the base and extending upwardly therefrom above the lower portion of the screen to over-lap at least some of the cutting elements on the screen, said member surrounding the lower portion of said screen and forming therewith and with the said base a chamber having an entrance at an intermediate position with respect to the length of the screen but well above the lower extremity thereof, the exit from said chamber being the said space between the relatively rotatable members.

JOHN J. WIRTS.